Figure 1:
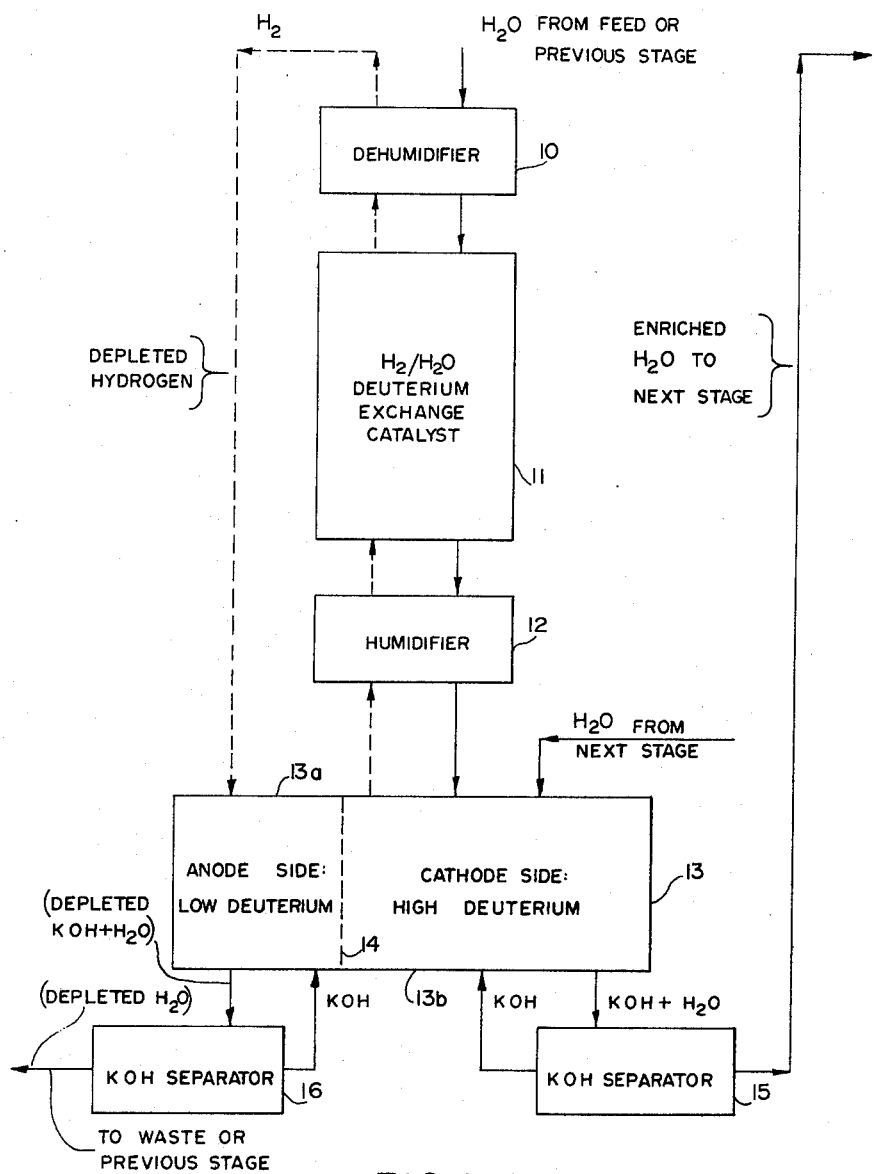

United States Patent [19]

Hammerli et al.

[11] 3,974,048

[45] Aug. 10, 1976

[54] APPARATUS AND METHOD OF PRODUCING HEAVY WATER INVOLVING CATALYTIC-ELECTROLYTIC EXCHANGE PROCESSES

[75] Inventors: Martin Hammerli; John P. Butler, both of Deep River, Canada

[73] Assignee: Atomic Energy of Canada Limited, Ottawa, Canada

[22] Filed: Mar. 19, 1975

[21] Appl. No.: 559,763

[30] Foreign Application Priority Data
May 3, 1974    Canada.............................. 198793

[52] U.S. Cl................................ 204/101; 204/129; 204/DIG. 4
[51] Int. Cl.[2]....................... C25B 1/10; C25B 1/02
[58] Field of Search................ 204/129, DIG. 4, 101

[56] References Cited
UNITED STATES PATENTS

| | | | |
|---|---|---|---|
| 3,306,832 | 2/1967 | Lewis et al........................... | 204/129 |
| R26,913 | 6/1970 | Lewis et al........................... | 204/101 |

FOREIGN PATENTS OR APPLICATIONS

| | | | |
|---|---|---|---|
| 726,771 | 3/1955 | United Kingdom................. | 204/101 |

*Primary Examiner*—R. L. Andrews
*Attorney, Agent, or Firm*—James R. Hughes

[57] ABSTRACT

A composite deuterium exchange process incorporating a catalytic exchange region and electrolytic cell region having an anode and cathode separated from each other by an electrolyte permeable diaphragm with liquid water and hydrogen gas being cycled through the two regions. It is preferred that the catalyst used in the catalytic exchange region is one that comprises at least one catalytically active metal selected from Group VIII of the periodic table and have a sealing coating directly thereon of waterproof (impermeable to liquid water) resin and are permeable to water vapor from the liquid water and hydrogen gas permeate the coating to contact the catalytically active metal thereby to exchange hydrogen isotopes, while the coating retards poisoning of the catalyst by liquid water.

10 Claims, 3 Drawing Figures

APPARATUS AND METHOD OF PRODUCING HEAVY WATER INVOLVING CATALYTIC-ELECTROLYTIC EXCHANGE PROCESSES

This invention relates to a method and apparatus for producing heavy water and more particularly to a combined electrolytic-catalytic process for heavy water production.

The standard process used for producing heavy water at the present time is the dual temperature deuterium exchange process involving exchange between water and hydrogen sulphide gas. This process which is generally known as the Girdler-Sulphide (GS) process is described in Canadian Pat. No. 574,293 issued to Atomic Energy of Canada Limited on Apr. 21, 1959. Exchange processes using catalysts have also been proposed and used. A process for the production of deuterium oxide using catalysts is described and claimed in U.S. Pat. No. 2,690,379 issued to H. C. Urey and A. V. Grosse on Sept. 28, 1954. A process and catalyst for enriching a fluid with hydrogen isotopes is described and claimed in Canadian Pat. No. 907,292, inventor W. H. Stevens and issued to Atomic Energy of Canada Limited on Aug. 15, 1972. The type of catalysts described in this latter patent have been found to be very effective and efficient in the deuterium exchange between liquid water and $H_2$ gas.

Another process proposed and used has been one involving electrolysis. U.S. Pat. No. 3,306,832 issued to G. P. Lewis and P. Ruetschi describes an electrolytic process for the concentration of heavy water which incorporates hydrogen oxidation fuel cell anodes.

It is an object of the present invention to provide a deuterium extraction process having improved $H_2$ and deuterium exchange efficiencies and economics.

This and other objects of the invention are achieved by a composite deuterium exchange process incorporating a catalytic exchange region and an electrolytic cell region having an anode and cathode separated from each other by an electrolyte permeable diaphragm with liquid water and hydrogen gas being cycled through the two regions.

Figure 2:
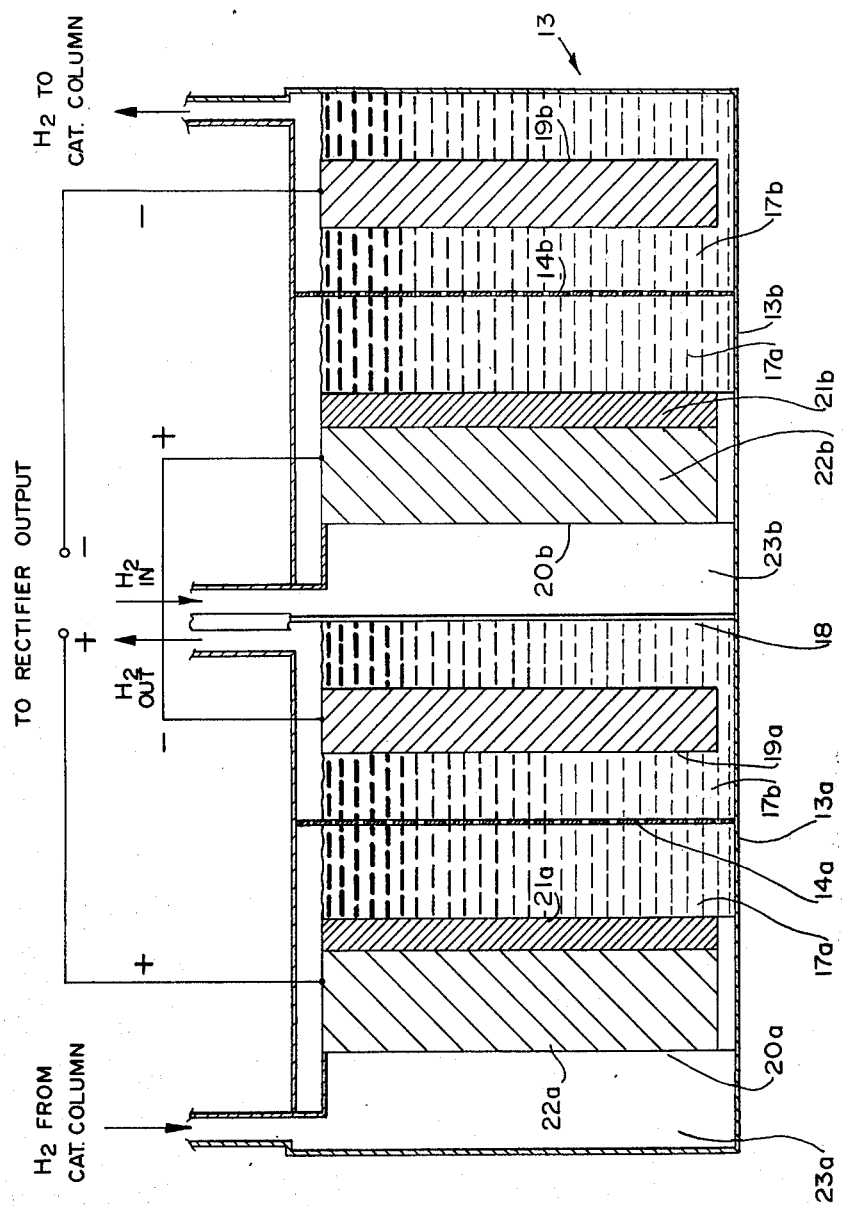
Figure 3:
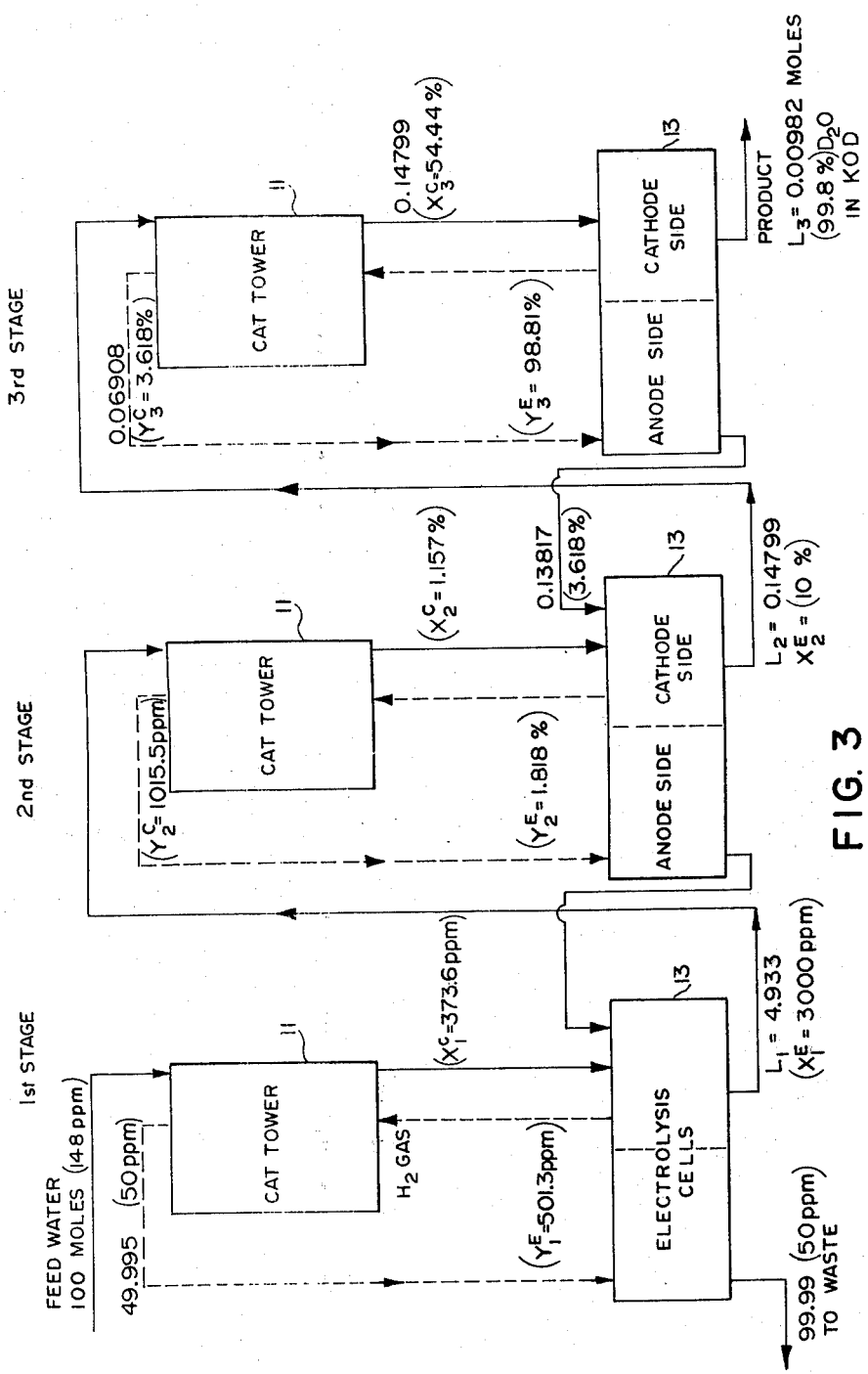

In drawings which illustrate an embodiment of the invention,

FIG. 1 is a flow diagram of one stage of the combined catalytic-electrolysis system, FIG. 2 is a cross-section of the electrolytic region, and FIG. 3 is a flow diagram of a three stage arrangement, Referring to FIG. 1, a single stage of the process is shown with input liquid water from the feed source or a previous stage passing through a dehumidifier 10 and then into a hydrogen gas/liquid water deuterium exchange catalyst region 11. Although there are several different types of catalyst that will function satisfactorily, it is preferred that the type of catalysts disclosed in Canadian Pat. No. 907,292 be used. These catalysts comprise at least one catalytically active metal selected from Group VIII of the periodic table and have a sealing coating directly thereon of waterproof (impermeable to liquid water) resin and are permeable to water vapour from the liquid water and hydrogen gas permeate the coating to contact the catalytically active metal thereby to exchange hydrogen isotopes, while the coating retards poisoning of the catalyst by liquid water. The water from region 11 which is enriched in deuterium passes through humidifier 12 and then to the electrolysis cell 13. The humidifier and dehumidifier sections are necessary in this process not only from the point of view of the liquid carry over but more importantly also from the point of view of minimizing the total separative work by preventing as much as possible the downgrading of any enriched deuterium stream. In catalyst tower 11, which as mentioned above contains an efficient $H_2/H_2O$ deuterium exchange catalyst, the liquid water is contacted countercurrently with hydrogen gas passing upwardly through the tower and also through humidifier 12 and dehumidifier 10. Deuterium is transferred from the hydrogen gas. Typically the gas leaving the top of the catalyst tower will contain 50 ppm. deuterium and the water leaving the bottom will contain 375 ppm. deuterium in the first stage of the process starting with natural water feed.

Electrolysis cell 13 is similar to that described in U.S. Pat. No. 3,306,832 and comprises an anode side 13a and a cathode side 13b separated by an electrolyte permeable diaphragm 14. The electrolyte used is an alkaline electrolyte e.g. KOH although an acidic and/or neutral electrolyte might be used. Water leaving the cathode side of the cell is enriched in deuterium and contains a proportion of KOH which is removed in KOH separator 15 and returned to the cell. The enriched water is passed to the next stage. The water leaving the anode cell is low (depleted) in deuterium content and contains a proportion of KOH which is removed in KOH separator 16 and returned to the cell. The depleted water is passed to waste or back to a previous stage. The electrolysis cell in effect engenders hydrogen gas which is recycled through the two systems as well as providing deuterium enrichment of the hydrogen gas.

Referring to FIG. 2, the electrolysis cell 13 is shown in more detail. Two sections 13a and 13b to the cell are shown each having an anolyte 17a (low deuterium) region and a catholyte 17b (high deuterium) region because of the large difference in their respective deuterium contents. The regions are separated by diaphragms 14a and 14b. The two sections are separated by an insulating barrier 18 and each contain cathodes (19a and 19b) and anodes (20a and 20b). The anodes are made up of fine pore layers (21a and 21b) and larger pore layers (22a and 22b). Single porosity anodes may be used if a hydrogen re-circulation system is used. The anodes and cathodes are connected to appropriate voltage supply sources to provide the necessary potentials in the cell. Hydrogen gas from the catalytic column passes into gas spaces 23a and 23b and is consumed by the anode (fuel cell) 20a and 20b and is oxidized to water and hydrogen evolved at the cathodes (19a and 19b) is passed to the bottom of the catalytic column.

For a commercial heavy water plant, many such individual cells of which 2 are shown in FIG. 2 are required. All the elementary cells in a given electrolysis tank containing approximately 1200 such cells are connected in series electrically. However, the material flows of each anode section of all elemental cells contained in a tank are connected in parallel. Similarly, the material flows of each cathode section are also connected in parallel, but in a separate circuit because of the difference in the deuterium concentration between the anolyte and the catholyte.

FIG. 3 shows a typical three stage process arrangement with feed-forward and feed-back connections operating at 60°C and 10 to 20 atmospheres pressure. Other reasonable temperatures and pressures are possible. Humidifiers and de-humidifiers are not shown and typical flow rates and deuterium concentrations are indicated. The term "anode side" and "cathode side" in FIGS. 1 and 3 denote the respective compartments of the appropriate number of elementary cells required in each stage. For the case shown in FIG. 3 the relative number of cells required in the first, second and third stage are 724, 36 and 1 respectively.

The deuterium concentration in the first stage product is not confined to 3000 ppm but could have a wide range of values depending on the total (capital plus operating) cost of the catalyst section relative to that of the electrolysis section. At low deuterium concentrations in the first stage product, the relative cost for electrolysis increases because the liquid reflux to the cells increases, while at high concentrations more catalyst is required. Similar arguments apply to deuterium concentration in the waste stream. It need not be fixed at 50 ppm. However, for the temperature chosen for the mass balance shown in FIG. 3 50 ppm and 3000 ppm are good choices for the deuterium concentrations in the waste stream and the first stage product stream, respectively.

ADVANTAGES OF THE COMBINED PROCESS VERSUS THE INDIVIDUAL PROCESSES.

ELECTROLYSIS

For conventional electrolysis the thermodynamic reversible cell potential is 1.23 volts and 25°C and 1.17 volts at 60°C. For the electrolysis process using fuel cell anodes which "burn" hydrogen to water and cathodes which evolve hydrogen from water, the thermodynamic reversible cell potential is zero. At practical current densities, for example 300 A/sq. ft. the conventional electrolysis cell potential is in the range 20 to 3 volts depending on cell design at 60°C. The cell potential of the electrolysis cell using hydrogen fuel cell anodes is in the range 0.2 to 0.4 volts at 60°C depending on cell design. Therefore, the advantage of using the latter cell is a reduction in practical cell voltage by at least a factor of 5 and possible up to a factor of 10. Energy costs for electrolysis are reduced by the same amount.

For an ideal cascade using the electrochemical process of U.S. Pat. No. 3,306,832 the total number of times the feed must be electrolyzed is of the order of 1.7 for an electrolytic separation factor of 6 and a feed containing 148 ppm deuterium. For the electrolysis of the coupled electrolysis - chemical exchange process, the total number of times the feed must be electrolyzed varies from 1.10 to 1.01 for first stage product deuterium concentration of 600 ppm to 30,000 ppm respectively. This represents an additional saving of at least 60% to almost 70% in the energy costs for electrolysis.

For the conventional as well as the electro-chemical process of U.S. Pat. No. 3,306,832 the number of stages required is of the order of 17 assuming an ideal cascade for the conditions mentioned above. For the coupled electrolysis chemical exchange process, the number of stages can easily be reduced to 3 as shown in FIG. 3. This is true regardless of whether the electrolysis cells are conventional or incorporate the hydrogen fuel cell anodes.

B. CHEMICAL EXCHANGE

1. With chemical exchange alone operating in the dual temperature mode as outlined in Canadian Pat. No. 907,292, the separation factor is limited by the temperature coefficient of the equilibrium constant for the two operating temperatures chosen. A practical maximum hot tower temperature of 200°C seems feasible for the $H_2/H_2O$ exchange reaction. At this temperature, the equilibrium constant for the exchange reaction is 2.00, while at cold tower temperatures of 23°C and 60°C its value is 4.02 and 3.19 respectively.

In the combined process, the separation factor at the operating temperature itself is utilized which is clearly greater than its temperature coefficient for practical cold and hot tower temperatures. Therefore, the number of theoretical plates required for a given separative work is smaller for the catalyst column in the combined process.

2. In the dual temperature exchange process, operating between 60° and 200°C, the maximum L/G ratio is about 0.5, where L and G denote the liquid and gas molar flow, respectively.

In the combined process, the slope of the operating line is much higher, the L/G ratio being approximately 2. As a result of the higher value of L/G the number of transfer units required for an equivalent amount of separative work in the gas phase is less than 55% of the number required in the cold tower of the dual temperature exchange process.

3. The higher L/G ratio of the combined process relative to the dual temperature process also has the very important consequence of reducing the total gas flow rate proportionately for a given heavy water production rate. A reduction in the gas flow in turn directly reduces the volume of catalyst and the size of the catalyst columns.

C. OTHER ADVANTAGES

1. The deuterium recovery for the case illustrated in FIG. 3 for the combined electrolytic-catalytic process is 66.2%. The corresponding deuterium recovery for the ideal cascade, using electrolysis only, is 59.2%. For the dual temperature catalytic $H_2/H_2O$ exchange process the corresponding deuterium recovery is about 33%. Therefore, the deuterium recovery for the combined electrolytic-catalytic process is larger than for either of the individual processes. This means smaller total flows for any given production rate are required.

2. The net result of advantages C.1 and B.1 to B3 inclusive, is that the amount of catalyst required in the combined electrolytic-catalytic process is less than ½ or 8% of that required in the cold tower of the bithermal process operating at the same temperature.

We claim:

1. A method of producing heavy water involving a composite catalytic-electrolytic deuterium exchange process comprising passing liquid water from feed or a previous enrichment stage through a catalytic deuterium exchange region containing a hydrogen gas/liquid water deuterium exchange catalyst and then through an electrolytic cell region, said cell including an anode and cathode connected to an electrical power supply and separated from each other by an electrolyte permeable diaphragm and an electrolyte, passing hydrogen gas in countercurrent relation to the liquid water through the catalytic deuterium exchange region to effect deuterium exchange between the gas and the liquid and then to the electrolytic cell where the hydrogen gas is at least partially consumed by the anode and hydrogen gas is evolved at the cathode, passing the hydrogen gas evolved at the cathode to the catalytic exchange region to pass therethrough, taking the water from the anode side of the electrolytic cell, said water being depleted in deuterium and passing to waste or back to a previous stage, and taking as output a portion of the water from the cathode side of the electrolytic cell, said water being enriched in deuterium and passing to further enrichment stages.

2. A method of producing heavy water as in claim 1 wherein the hydrogen gas/liquid water exchange catalyst comprises at least one catalytically-active metal selected from Group VIII of the periodic table and having a sealing coating directly thereon of waterproof (impermeable to liquid water) resin and are permeable to water vapour from the liquid water and hydrogen gas such that water vapour from the liquid water and hydrogen gas permeate the coating to contact the catalytically active metal thereby to exchange hydrogen isotopes while the coating retards poisoning of the catalyst by liquid water.

3. A method of producing heavy water as in claim 1 wherein the said electrolyte is an alkaline electrolyte.

4. A method of producing heavy water as in claim 1 wherein the said electrolyte is an acidic electrolyte.

5. A method of producing heavy water as in claim 1 wherein the said electrolyte is a solution containing KOH.

6. A method of producing heavy water as in claim 1 further comprising passing the water taken from the anode side of the electrolytic cell and the water taken from the cathode side of the electrolytic cell through respective electrolyte removal means and recycling the electrolyte material thus recovered back to the electrolytic cell.

7. Apparatus for producing heavy water comprising:
a. a catalytic deuterium exchange column containing an $H_2/H_2O$ deuterium exchange catalyst for effecting deuterium exchange between liquid water and hydrogen gas passing therethrough in exchange relation and having a liquid feed input connection,
b. an electrolytic cell including an electrolyte, an anode and a cathode in said electrolyte and connected to an electrical power supply and separated from each other by an electrolyte permeable diaphragm,
c. connections between said column and said cell such that water having passed through the column is passed to the cell, hydrogen gas having passed through the column is applied to the anode side of the cell to be consumed at the anode, and hydrogen gas evolved at the cathode is passed to the column,
d. means for taking a portion of the water in the anode side of said cell and passing to waste or to a previous enrichment stage, and
e. means for taking as output a portion of the water in the cathode side of said cell and passing to the output or to further enrichment stages.

8. Apparatus for producing heavy water as in claim 7 further comprising means connected to the water outputs of the cell for removing electrolyte material from the water and recycling said material back to the cell.

9. Apparatus as in claim 7 wherein the electrolyte is a solution containing KOH.

10. Apparatus as in claim 7 further comprising humidifying and dehumidifying means connected in the gas and liquid connections between column and cell.

* * * * *